United States Patent Office 3,694,389
Patented Sept. 26, 1972

3,694,389
THERMOSETTING COATINGS BASED ON OXIME-BLOCKED ISOCYANATES
Jerome F. Levy, Dresher, Pa., assignor to Rohm and Haas Company, Philadelphia, Pa.
No Drawing. Filed Aug. 6, 1970, Ser. No. 61,792
Int. Cl. C08g 22/06
U.S. Cl. 260—23 TN        11 Claims

ABSTRACT OF THE DISCLOSURE

Thermosetting coating compositions which comprise an oxime-blocked polyisocyanate and a solution copolymer of an active hydrogen-containing monoethylenically unsaturated compound. The curing of these compositions is most effectively cataylzed by an organosoluble zinc salt.

This invention relates to thermosetting coating compositions which comprise an oxime-blocked isocyanate and a copolymer of an active hydrogen-containing monoethylenically unsaturated compound. The compositions of the invention can be cured by heating to give tough, solid, chemically-resistant polymeric materials.

The reaction of isocyanates with active hydrogen compounds such as amines and alcohols to form polyureas and polyurethanes has been greatly studied in the prior art, and this general class of polymers has been found to possess many useful properties. Since isocyanates generally react quickly and efficiently with active hydrogen compounds at room temperatures, these two components usually must be mixed together only at the time and place at which reaction is desired. In an approach to making so-called "one pot" formulations or compositions, in which the reacting materials are packaged together before using, and later activated, relatively unreactive derivatives of isocyanates have been used which will regenerate the free isocyanate upon heating. Various catalysts are also often contained in these compositions to facilitate the regeneration of isocyanate. In known blocked isocyanate coating compositions, phenol and its derivatives have been widely used as blocking agents. However, when the compositions are heated for curing, free phenol is produced which has an undesirable odor and is corrosive and toxic. Furthermore, the phenol-blocked isocyanate containing compositions must be heated to a rather high temperature to effect cure. Thus, it would be extremely desirable to have polymer-forming coating compositions comprising blocked isocyanates which cure at lower temperatures without the production of undesirable phenolic by-products.

The novel coating compositions of the invention comprise a ketoxime-blocked isocyanate and a solution copolymer of at least about 1% by weight of at least one active hydrogen-containing monoethylenically unsaturated compound, from 0 to about 25% by weight, and preferably about 1 to about 5% by weight, of at least one monoethylenically unsaturated carboxylic acid, and from 0 to about 99% by weight of at least one copolymerizable ethylenically unsaturated compound. The coating compositions of the invention advantageously cure at lower temperatures than similar compositions comprising phenol-blocked isocyanates, and avoid the production of phenolic by-products. Moreover, the compositions of the invention combine many of the beneficial properties of acrylic and urethane systems, and are more soluble in usual coating solvents than the phenol-blocked isocyanates, have good storage stability or "pot life," and cure to coatings having good exterior durability and good gloss retention.

The solution polymer comprised by the coating compositions of the invention can contain up to 100% of the active hydrogen-containing compound, that is, it can be a homopolymer of this compound. In general, however, the active-hydrogen containing compound will be present in the copolymer in about 1 to about 30% by weight, and preferably about 5 to about 15% by weight. While the carboxylic acid is an optional component in the copolymer, it has been found that when the acid is used in making the copolymers, the coating compositions derived from such copolymers have particularly advantageous properties, including making the curing reaction proceed more smoothly and facilitating the dispersion of pigment in the coating compositions. As little as about ½%, by weight, of the acid can give beneficial properties.

The ratio of latent isocyanate to active hydrogen in the compositions of the invention can be varied greatly, and the actual ratio chosen will depend in part on the qualities desired in the cured coating and on the relative cost of the components involved. In general, the ratio of latent isocyanate groups to active hydrogen atoms will be about 0.5 to about 3, and in a preferred embodiment of the invention this ratio will be about 1 to about 2.

The ketoxime-blocked isocyanate of the compositions of the invention are easily prepared by reacting an isocyanate with a ketoxime. Generally, the reaction proceeds readily when the oxime and the isocyanate are mixed in a solvent which is inert to the reaction, such as benzene, toluene, xylene, or similar unreactive hydrocarbon. The ketoximes are prepared by the well-known reaction of hydroxylamine hydrochloride with a ketone. Of course, other well-known methods for preparing ketoximes, such as reaction of a hydrocarbon with nitrosyl chloride, according to the procedure of Naylor and Anderson, J. Org. Chem., 18, 115 (1953). A wide variety of ketoximes can be used to make the blocked isocyanates. The choice of ketoxime is not critical and will depend mainly on the cost of the starting ketone, and may also depend in part on the volatility of the oxime. Among the oximes which can be used in making the ketoxime-blocked isocyanates are acetone oxime, 2-butanone oxime, 3-methyl-2-butanone oxime, 2-pentanone oxime, 3-pentanone oxime, 4-methyl-2-pentanone oxime, 2-heptanone oxime, 3-heptanone oxime, cyclohexanone oxime, actophenone oxime, and the like. An especially preferred ketoxime is the oxime of 2-butanone.

Substantially any polyisocyanate, including prepolymers having terminal —NCO groups, can be used in making the blocked isocyanates for the compositions of the invention. As used in the present specification and claims, the terms "polyisocyanate" and "polyfunctional isocyanate" mean any compound, monomeric or polymeric, having two or more —NCO groups. The isocyanates which are used in the compositions of the invention are known materials.

Among the polysiocyanates which can be used in the compositions of the invention are aliphatic isocyanates such as 1,6-hexamethylene diisocyanate, 1,8-octamethylene diisocyanate, 1,12-dodecamethylene diisocyanate, 2,2,4-trimethylhexamethylene diisocyanate, and similar alkylene diisocynates, 3,3'-diisocyanatodipropyl ether, 3-isocyanatomethyl - 3,5,5 - trimethylcyclohexyl isocyanate, cyclopentylene-1,3-diisocyanate, cyclohexylene-1,4-diisocyanate, methyl 2,6-diisocyanatocaproate, and related isocyanates, bis(2-isocyanatoethyl)fumarate, 4 - methyl-1,3-diisocyanatocyclohexane, trans-vinylene diisocyanate and similar unsaturated isocyanates, 4,4'-methylene-bis(cyclohexyl isocyanate), and related isocyanates, menthane diisocyanate, N,N',N" - tris(6 - isocyanatohexamethylene) biuret, and related isocyanates, bis(2-isocyanatoethyl)carbonate, and similar carbonate diisocyanates, as well as other known isocyanates derived from aliphatic polyamines, aromatic isocyanates, such as tolylene diisocyanates, xylylene diisocyanates, dianisidine diisocynate, 4, 4'-diphenylmethane diisocyanate, 1-ethoxy-2,4-diisocyanatobenzene, 1-chloro-2,4-diisocyanatobenzene, tris(4 - isocyanatophenyl)methane, naphthalene diisocyanates, fluorene diisocynates, 4,4'-biphenyl diisocyanate; phenylene diisocyanates, 3,3'-dimethyl-4,4'-biphenyl diisocyanate, p-isocyanatobenzyl isocyanate, tetrachloro - 1,3 - phenylene diisocynate, and related isocyanates, 2,4,6-tribromo-1,3-phenylene diisocyanate, bis(2-isocyanatoetheyl)benzene, prepolymers of polyisocyanates with polyhydroxyl or polyamine compounds, such as, prepolymers of 3-isocyanatomethyl-3,3,5-trimethylcyclohexylisocyanate, tolylene diisocyanate, menthane diisocyanate, 4,4'-methylene-bis (cyclohexylisocyanate), 4,4' - methylene-bis(isocyanatocyclohexane), 2-isocyanatoethyl - 6 - isocyanatocaproate, and the like with polyether polyols, polyester polyols, and the like.

The preparation of the isocyanate prepolymers useful in the compositions of the invention is well known in the art. Generally, the preparation of these prepolymers involves the reaction of a polyol, polyether, hydroxyl-terminated polyester, polyester amide, or other polyfunctional active hydrogen compound, with a diisocyanate or other polyisocyanate, preferably using an excess of the isocyanate to yield an isocyanate terminated prepolymer product. An extensive description of some of the useful techniques for preparing the isocyanate prepolymers can be found in J. H. Saunders and K. C. Frisch, Polyurethanes: Chemistry and Technology, Part II, Interscience (New York, 1964), especially on pages 8 to 49, and in the various references cited by Saunders and Frisch. Other prepparative techniques which are known in the art can also be employed.

Other polyfunctional isocyanates which are useful in the compositions of the invention are disclosed in U.S. Pat. 3,162,664, of Brotherton et al., granted Dec. 22, 1964, U.S. Pat. 3,427,346, of Brotherton et al., granted Feb. 11, 1969, U.S. Pat. 3,275,679, of Brotherton et al., granted Sept. 27, 1966, U.S. Pat. 3,352,830, of Schmitt et al., granted Nov. 11, 1967, U.S. Pat. 2,729,666 of Stallman, granted Jan. 3, 1956, U.S. Pat. 2,768,154 of Unruh et al., granted Oct. 23, 1956, U.S. Pat. 3,267,122 of Lehmann et al., granted Aug. 16, 1966, U.S. Pat. 3,281,378, of Garber et al., granted Oct. 25, 1966, U.S. Pat. 3,124,-605, of Wagner, granted Mar. 10, 1964, U.S. Pat. 2,718,-516, of Bortnick, granted Sept. 20, 1955, as well as isocyanates prepared from the amines disclosed in U.S. Pat. 3,256,318, of Brotherton et al., granted June 14, 1966. Other polyisocyanates, such as those containing silicon and phosphorus can also be used in making the compositions of the invention.

An especially useful class of polyfunctional aliphatic isocyanates are the ester isocyanates represented by the formulas

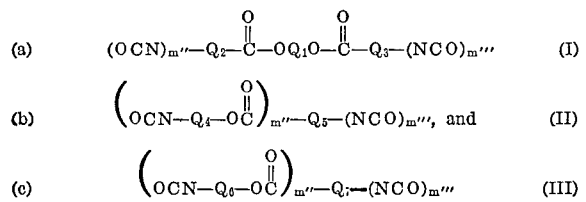

wherein $m''$ and $m'''$ are either one or two; $Q_1$ is the diester residue of an alkane or cycloalkane diol having two primary hydroxyl groups, preferably from 2 to 18 carbon atoms, and up to one hetero oxygen or sulfur atom; $Q_2$ and $Q_3$ are divalent alkylene or cycloalkylene radicals, preferably having 1 to 18 carbon atoms; $Q_4$ is an alkylene or cycloalkylene radical, preferably having 2 to 8 carbon atoms, and up to one hetero oxygen or sulfur atom; $Q_5$ is a divalent arylene or aralkylene radical, preferably having 6 to 18 carbon atoms; $Q_6$ is an alkylene or cycloalkylene radical, preferably having 2 to 8 carbon atoms, and up to one hetero oxygen or sulfur atom; and $Q_7$ is a divalent alkylene or cycloalkylene radical, preferably having 1 to 18 carbon atoms.

The isocyanates of Formulas I, II, and III are prepared by phosgenation of the corresponding amine hydrochlorides. The amino groups of these amines are provided in whole or in part by an amino acid. The amino acids which are useful in preparing isocyanates of Formulas I, II, and III are the mono-amino-monocarboxylic acids, the monoamino-dicarboxylic acids, the diamino-monocarboxylic acids diamino-dicarboxylic acids and lactams having 3 to 12 carbon atoms in the ring. The amine hydrochlorides in which the amino groups are provided in part by an amino acid are produced by reacting one or more of the designated class of amino acids in its acid salt form with an alkanolamine hydrochloride. The amine hydrochlorides in which the amino groups are provided wholly by an amino acid are produced by reacting a monoamino-monocarboxylic acid or a lactam with a monohydroxy or dihydroxy alcohol (hereinafter referred to as "alcohols" and "diols," respectively), the amino groups being converted to acid salt form before the esterification reaction. In addition, compounds containing four amine hydrochloride groups are produced by reacting a diamino-monocarboxylic acid with a diol. Preferably these esterification reactions are carried out while passing a stream of hydrogen chloride gas through the reaction mixture while the esterification proceeds.

To produce the acyl-containing amine hydrochlorides useful in preparing isocyanates of Formulas I, II, and III, the amino group or groups of the amino acid are first converted to acid salt form by reaction with a strong acid, preferably hydrochloric acid, and the resulting product is then reacted with an alkanolamine (also converted to a strong acid salt as the hydrochloride), an alcohol or a diol in an inert liquid reaction medium. The amino acid and the alcohol, diol or alkanolamine must have a significant solubility in each other under the reaction conditions, or the inert liquid used as the reaction medium must be a mutual solvent for these materials. The reaction temperature may be from about 40° C. to the temperature at which the amine acid salts present in the reaction mixture dissociate to form the free amine. Preferably the reaction is carried out at from about 50° C. to 180° C. Desirably an esterification catalyst is used to promote the reaction. Suitable catalysts include, for example, hydrogen chloride, chlorosulfonic acid, p-toluenesulfonic acid, and the like. In a preferred preparative technique, a stream of hydrogen chloride gas is passed through the reaction mixture while the reaction proceeds, in which case no separate catalyst for the esterification is needed. Means should be provided to distill off or otherwise remove the water formed during the esterification. The reaction may be carried out at sub-atmospheric or super-atmospheric pressures but preferably is carried out at atmospheric pressure. Liquid reaction media which may be used for the esterification include aromatic hydrocarbons, chlorinated aromatic hydrocarbons, chlorinated aliphatic hydrocarbons, chlorinated alicyclic hydrocarbons, tetramethylenesulfone, and other organic solvents which are inert to the reaction. When one of the reactants is a liquid or is molten under the reaction conditions, an excess of such reactant may be used as the reaction medium so long as such excess does not cause polymerization or promote other undesirable side-reactions. In certain instances where the reaction product itself is a liquid under the reaction conditions, it apparently acts as the inert liquid, the initial esterification forming the first quantities of such product occurring in the presence of water (which is later distilled off as esterification proceeds) which is a solvent for the amine hydrochlorides.

When a lactam is used as the amino acid, desirably water (preferably about one mole per mole of lactam) is added along with a strong acid (preferably hydrochloric acid) to facilitate opening the ring. An undue excess of water is to be avoided since it must be removed during the esterification. The lactam may be first heated in contact with the water-acid mixture to open the ring, and then the alcohol, diol or alkanolamine added along with an inert organic liquid and an azeotropic agent and the ester prepared as described above preferably using a stream of hydrogen chloride gas. Alternatively, all the reagents may be charged initially, the mixture heated without removal of water for a sufficient time to open the ring, and then the water is removed causing esterification to proceed. In this latter case, it is sometimes desirable to carry out the ring opening step in a sealed pressure vessel under autogenous pressure. Other variations may also be used, as initially charging all the materials except the azeotropic agent which is added after ring opening. The use of water in this manner is not essential and good results have been obtained without its use.

The amine hydrochlorides produced in this manner can be converted to the corresponding isocyanates by reaction with phosgene or other carbonyl dihalide. Phosgene may be employed in either liquid or gaseous form. The amine hydrochloride is dispersed in an inert liquid reaction medium, phosgene added, preferably in excess of that needed to react quantitatively with the amino groups present, and the temperature of the reaction medium maintained at from about 100° C. to 225° C. The molar ratio of phosgene to amine hydrochloride group may be from about 1.1:1 to 10:1 and preferably is at least 2:1. Suitable liquid reaction media include aromatic hydrocarbons, chlorinated aromatic hydrocarbons, chlorinated aliphatic hydrocarbons, chlorinated alicyclic hydrocarbons, and other organic solvents inert to the phosgenation reaction. The phosgenation may also be carried out in steps. A purified amine hydrochloride may be used for the phosgenation or, if desired, the crude reaction product of the reaction between the amino acid and the alkanolamine hydrochloride, alcohol or diol may be used.

The alkanolamines which are useful in preparing isocyanates of Formulas I, II, and III preferably contain from 2 to 8 carbon atoms, have one primary or secondary hydroxyl group and one primary amino group and may include one hetero oxygen or sulfur atom in the alkyl chain. The alkyl group of the alkanolamine can be substituted with inert substituent groups as alkyl, nitro, halogen, alkoxy, etc. Particularly preferred alkanolamines are ethanolamine, 2-(2-aminoethoxy)-ethanol, 1-amino-2-propanol, 2-amino-1-propanol, 2-methyl-2-amino-1-propanol, 3-amino-1-propanol and 2-amino-1-butanol. Mixtures of alkanolamines can be used.

The diols which can be used are those having two primary hydroxyl groups, preferably from 2 to 18 carbon atoms, and can be aliphatic, such as for example alkane, alicyclic, such as for example cycloalkane, or arenedialkyl. The diols can have a hetero oxygen or sulfur atom and can be substituted with inert substituent groups as alkyl, nitro, halogen, alkoxy, etc. Among the diols which can be used are the $\alpha,\omega$-aliphatic diols, p-bis-(hydroxymethyl) cyclohexane, p-phenylenedimethylene diol, diethylene glycol, and the like. Mixtures of diols can be used.

Any alcohol can be used which has either a primary or secondary hydroxyl group. The alcohol can be aliphatic, alicyclic or aralkyl. Preferred alcohols are the aliphatic alcohols such as alkanols having from six to twenty-four carbon atoms. Like the other reactants, the alcohol can contain inert substituent groups. Further, the alcohol can contain one hetero oxygen or sulfur atom. Suitable alcohols include arachidyl, behenyl, benzyl, tetrahydrofurfuryl, phenylpropyl, tridecyl, trimethylnonyl, stearyl, cyclopentyl, hexyl, isooctyl, and the like.

The amino acids which can be used in preparing isocyanates of Formulas I, II, and III can be either optically active or inactive and include monoamino-monocarboxylic acids such as alanine, isoleucine, 3-aminobutyric acid, 3-aminopropionic acid, 3-amino-2-methyl propionic acid, phenyl alanine, p-aminobenzoic acid, methionine, $\omega$-amino acids generally, etc.; monoamino-dicarboxylic acids such as aspartic acid and glutamic acid; diamino-monocarboxylic acids such as lysine and ornithine; diamino-dicarboxylic acids such as lanthionine; and lactams such as $\beta$-methyl-$\beta$-butyrolactam, $\alpha,\beta$-dimethylbutyrolactam, $\alpha,\alpha',\beta$-trimethylbutyrolactam, $\beta$-carbomethoxy-$\beta$-butyrolactam, $\beta$-phenyl-$\beta$-propiolactam, $\beta$-methyl-$\beta$-caprolactam, $\beta$-methyl-$\beta$-valerolactam, $\beta$-ethyl-$\beta$-valerolactam, 2-pyrrolidone, 6-methyl-2-piperidone, 3-methyl-$\epsilon$-caprolactam and 7-methyl-$\epsilon$-caprolactam. The amino acids can be substituted with inert substituent groups as alkyl, alkoxy, nitro, halogens, and the like, and may contain one or more hetero atoms which do not interfere with the esterification reaction, and, where applicable, the subsequent phosgenation. Mixtures of amino acids may be used. The diamino-monocarboxylic acids disclosed in French Patent 1,351,368 can be used. Amino acids occur widely in nature and a number of synthesis methods are available for their production from inexpensive raw materials. Thus the addition of ammonia to an unsaturated acid may be used to produce inexpensive amino acids for use in the instant invention.

Further description of the preparation of the isocyanates of Formulas I, II, and III can be found in United States patent application Ser. No. 518,977, of W. D. Emmons and J. F. Levy, filed Jan. 6, 1966, now U.S. Patent 3,567,763, granted on Mar. 2, 1971.

A wide variety of monoethylenically unsaturated active hydrogen-containing compounds can be used in the copolymers of the coating compositions of the invention. The preferred hydroxyl-containing compounds are the hydroxyalkyl esters of $\alpha,\beta$-unsaturated acids, the aminoalkyl esters of $\alpha,\beta$-unsaturated acids, and $\alpha,\beta$-unsaturated amides. A preferred class of active hydrogen-containing compounds are the hydroxyl-containing monomers having the general formula

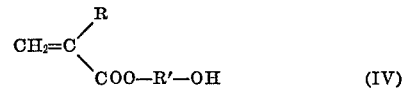

(IV)

wherein
R is hydrogen or a methyl group and
R' is a divalent alkylene radical having 2 to 5 carbon atoms, such as ethylene, propylene, 1-ethylene, 1-methyl-propylene, butylene, pentylene, in both branched and straight chain configurations. Of course, R' can also have substituents which are inert to the polymerization and curing reactions, such as nitro groups, halogen atoms, or alkoxy groups.

Examples of hydroxyl-containing monomers of Formula IV include 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, 5-hydroxypentyl acrylate, 5-hydroxypentyl methacrylate, 2-hydroxypropyl acrylate, 2-hydroxypropyl methacrylate, 1-methyl-2-hydroxyethyl acrylate, 1-methyl-2-hydroxyethyl methacrylate, and the like. Other useful active hydrogen-containing monomers include 6-hydroxyhexyl acrylate, 6-hydroxyhexyl methacrylate, methacrylamide, acrylamide, 3-hydroxypropyl crotonate, di(2-hydroxyethyl)maleate, di(2-hydroxyethyl) fumarate, 2-aminoethyl acrylate, 2-aminoethyl methacrylate, 2-aminopropyl acrylate, 2-aminopropyl methacrylate, 2-t-butylaminoethyl acrylate, 2-ethylaminoethyl methacrylate, and the like.

A wide variety of monoethylenically unsaturated carboxyic acids can be used in the copolymers of the coating compositions of the invention. Examples of suitable acids include acrylic acid, methacrylic acid, ethacrylic acid, $\alpha$-chloracrylic acid, itaconic acid, crotonic acid, 4-pentenoic acid, and the like. The preferred acids are acrylic acid and methacrylic acid. When incorporated into the compositions of the invention, the acid groups of the copolymer can be either in their salt form or in their free acid form.

A wide variety of copolymerizable ethylenically unsaturated compounds can also be used in the copolymers of the coating compositions of the invention. Examples are the esters of $\alpha,\beta$-ethylenically unsaturated monocarboxylic acids, $\alpha,\beta$-ethylenically unsaturated aldehydes, esters of $\alpha,\beta$-ethylenically unsaturated dicarboxylic acids, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated akanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof. Specific examples of suitable monomers which may be copolymerized for use according to the invention are esters and half esters of acrylic acid, methacrylic acid, itaconic acid, maleic acid, 4-pentenoic acid, phthalic acid, and the like with alkanols having 1 to 20 carbon atoms, such as methanol, ethanol, propanol, butanol, hexanol, dodecanol, pentadecanol and the like, acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as $\beta$-aminoethyl vinyl ether, aminopentyl vinyl ether, tertiary amino-containing compounds such as dimethylaminoethyl methacrylate, and the like, and their various amine salts, such as the chloride or hydroxide salts, ureido monomers such as are disclosed in U.S. Patent Nos. 2,881,155 to Hankins, 3,300,429 to Glavis and Keighly, and 3,356,627 to Scott, including $\beta$-ureidoethyl acrylate, $\beta$-(N,N'-ethyleneureido)ethyl acid maleate, $\beta$-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'-vinyl-N,N'-ethyleneurea, N - hydroxyethylacrylamide, N-methylol-acrylamide, and N,N-(dimethylaminoethyl)acrylamide, and the like. The preferred comonomers are styrene and the $(C_1-C_4)$alkyl esters of acrylic and methacrylic acid.

The copolymers used in the coating composition are prepared by well-known solution polymerization techniques. Preferably, a solvent is used for the polymerization reaction which can also be employed as the solvent for the coating application. The monomers comprising the hydroxyalkyl ester and other monoethylenically unsaturated compounds in the proportions needed to give the composition hereinabove defined are mixed in the solvent at a concentration of about 10 to 60% total monomer in the entire solution and any suitable free-radical initiator soluble in the solvent is introduced. The initiator may be an azo catalyst, a peroxygen compound, such as t-butyl peracetate, or a peroxide, such as benzoyl peroxide, or a hydroperoxide, such as t-butyl hydroperoxide, or cumene hydroperoxide. The solution is heated to reflux to effect copolymerization and held at reflux for a period of 2 to 6 hours or more. Thereafter, the solution of the copolymer may be cooled and the ketoxime-blocked isocyanate prepared as described hereinafter may be introduced with adjustment of the solvent content to provide the concentration desired.

The compositions of the invention need not contain a solvent, but a suitable inert solvent can be added to the composition, if desired, either at the time of original formulation or at the time of use. The rate of reaction of the unblocked isocyanate with the copolymer can be influenced by the presence of a solvent. Included among the solvents which can be used are toluene, xylene, liquid aliphatic hydrocarbons, isopropyl ether, ethyl acetate, $\beta$-ethoxyethyl acetate, methyl ethyl ketone, and the like, as well as mixtures of such solvents. Pigments, dyes, fillers, antioxidants and antiozodants, stabilizers, flow control agents, or other optional ingredients can also be included in the compositions of the invention.

The compositions of the present invention are adapted to be applied in any suitable fashion to the substrate to be coated such as by brushing, spraying, dipping, roller coating, or by any other suitable method known in the art. After application, the compositions are cured by heating.

The compositions of the invention can be used for the coating of a wide variety of substrates including metals, paper, textiles, leather, wood, ceramics, brick, stone, and concrete surfaces.

As stated above, the compositions, after application to the substrates to be coated, are cured by heating. The curing process comprises the unblocking of the isocyanate followed by the reaction of the free isocyanate with the active hydrogen-containing copolymer. In order to facilitate the curing of the coating, a catalyst can be added to the compositions of the invention. When no catalyst is added to the composition, the curing reaction can generally be effected at a temperature of about 125° to about 325° C. When a catalyst is added to the composition, the curing reaction will generally proceed satisfactorily at temperatures as low as about 80° C. The time of curing may vary from a period of about one-half to two minutes at higher temperatures to a period of one or two hours at lower temperatures. A particularly practical curing operation can be effected by heating for about 30 minutes at about 100° to 120° C., when a catalyst is present and at about 140° to 160° C. when no catalyst is present.

The curing reaction can be catalyzed, if desired, by any of the known "unblocking" catalysts, including lead octoate, stannous octoate, dibutyl tin salts, such as dibutyl di-2-ethylhexoate, 2,2,1-diazobicyclooctane, tetramethylbutane diamine, metallic naphthenates, metallic acetylacetonates, and the like. However, it has been unexpectedly found that organosoluble zinc salts are superior catalysts for the curing reaction. Among the organosoluble zinc salts which are particularly useful are zinc chloride, zinc naphthenate, and the organosoluble zinc salts of monocarboxylic alkenoic or alkanoic acids having 4 to 18 carbon atoms, including zinc caproate, zinc octoate, zinc laurate, zinc palmitate, zinc caprate, zinc linoleate, zinc pentadecanoate, and the like. The catalyst salts must be organosoluble. As the term is used herein, "organosoluble" means that the material has appreciable solubility, that is, at least about 0.05% by weight, in common solvents such as ethanol, acetone, ether, methylethyl ketone, or hydrocarbons such as toluene, and must be soluble to a similar extent in the liquid reaction mixture which contains the blocked isocyanate. When a catalyst is included in the coating compositions, any amount which will give the desired degree of catalysis can be used. Generally, the catalyst will be present in the composition in an amount of about 0.2 to about 3% by weight, and preferably about 1 to about 2½% by weight, based on the weight of the coating solids, but a lesser or greater amount may be used advantageously in some compositions.

The following examples will further illustrate the preparation and use of the coating compositions of the invention, but are not intended to limit the invention in any way.

Example 1.—Preparation of 2-butanone oxime blocked 2-isocyanatoethyl 6-isocyanatocaproate Eighty-seven and one-tenth grams of 2-butanone oxime (1.0 mole) are added dropwise to a stirred and cooled solution of 113.2 g. (0.5 mole) of 2-isocyanatoethyl 6-isocyanatocaproate in 133 g. of xylene. Over the 20 minute addition period, the temperature is held between 15 and 25° C. The mixture is then warmed to room temperature and allowed to stand at room temperature for 2.5 hours. Over the first half hour there is some slight exotherming. Infrared analysis at the end of the 2.5 hour period indicates the presence of only trace amounts of unreacted isocyanate. The resulting product is a 60% xylene solution of oxime blocked isocyanate.

The same blocked isocyanate, prepared by direct reaction between isocyanate and oxime without solvent is an oil, and shows the expected absorption in its infrared spectrum.

Example 2.—Preparation of phenol blocked 2-isocyanatoethyl 6-isocyanatocaproate

To a 500 ml. flask fitted with a mechanical stirrer, thermometer, condenser and addition funnel is charged 94.0 g. (1.0 mole) of phenol, 250 ml. of Solvesso 100 and 2 g. of dibutyltin dilaurate. With stirring 113 g. of 2-isocyanatoethyl 6-isocyanatocaproate (0.5 mole) is added over a 30 minute period. The reaction exotherm carries the temperature to 50° C. After the addition was complete the temperature was raised to 90° C. for 3 hours. After cooling the mixture to 50° C., 250 ml. of hexane is added to the mixture while stirring, causing a solid to precipitate (M.P. 57–65). The solid is filtered, dried in vacuo, and recrystallized from a toluene/xylene/10/1 solvent mixture to yield 180 g. of a white crystalline power (M.P. 73–75). The infrared spectrum of the compound is characteristic of a phenol blocked isocyanate and contains no isocyanate adsorption.

Example 3.—Preparation of urethane prepolymer

To a two-liter three-neck flask equipped with a mechanical stirrer, thermometer, condenser and drying tube, and nitrogen bleed is charged 300.0 g. of polypropylene glycol (MW 425) (7.06 moles), 94.7 g. of dipropylene glycol (7.07 moles), 537.0 g. of isophorone diisocyanate (3-isocyanatomethyl - 3,5,5-trimethylcyclohexyl isocyanate) (2.42 moles), 923.7 g. of xylene, and 0.10 g. of dibutyltin dilaurate. Upon mixing and heating, the mixture exotherms to a temperature of 70° C. After one hour the temperature has cooled to 62° C. where it is held for the next four hours. The final mixture has an isocyanate content, as determined by the butyl amine procedure of 1.06 meq./g., and a Gardner-Holdt viscosity of A–3.

Examples 4–19.—Coatings from blocked isocyanate/acrylic polyol compositions

In the following examples, various acrylic polyol compositions were cast as films having a dry thickness of 1.5 to 2.0 mils on chromate-treated aluminium. The cast films were allowed to air-dry at room temperature for 30 minutes and were then cured by heating at 500° F. for 2 minutes.

The acrylic polyols used in Examples 4 to 19 are listed in Table I (all parts are parts by weight).

TABLE I.—ACRYLIC POLYOLS

| Resin | Composition | Percent solids | Solvent |
| --- | --- | --- | --- |
| A | Styrene/methyl methacrylate/butyl methacrylate/butyl acrylate/HPMA[a]/methacrylic acid, 25/10/30/22.5/10/2.4. | 50 | Xylene. |
| B | Styrene/methyl methacrylate/butyl methacrylate/butyl acrylate/HPMA,[a] 25/12.5/30/22.5/10. | 48.3 | Do. |
| C | Styrene/methyl methacrylate/butyl methacrylate/butyl acrylate/2-hydroxyethyl methacrylate, 25/12.5/30/22.5/10. | 48.2 | Do. |

[a] HPMA = a mixture of 2-hydroxypropyl methacrylate and 1-methyl-2-hydroxyethyl methacrylate.

All of the films evaluated were pigmented with 40% $TiO_2$ pigment. Some of the films were cured with phenol-blocked 2-isocyanatoethyl 6-isocyanatocaproate (made as in Example 2) while the remainder were cured with 2-butanone oxime-blocked 2-isocyanatoethyl 6-isocyanatocaproate (made as in Example 1). The ratio of blocked isocyanate equivalents to active hydrogen atoms (from hydroxyl and carboxyl groups) in the compositions evaluated was 1.2. Catalyst, where present, was added as the octoate salt, at a level corresponding to 0.5% metal on total solids.

The properties—Tukon hardness, flexibility, and direct impact—of each of the films are summarized in Table II.

TABLE II.—BLOCKED-ISOCYANATE/ACRYLIC POLYOL COATINGS

| | | | | Properties | | |
| --- | --- | --- | --- | --- | --- | --- |
| Example number | Polyol | Blocking agent | Catalyst | Tukon hardness (KHN) | Flexibility (T-bend) | Direct impact (inch pounds) |
| 4 | A | Oxime | | 14 | $T_2$ | 5 |
| 5 | A | Phenol | | 2 | $T_2$ | 3 |
| 6 | A | Oxime | Ca octoate | 14 | $>T_5$ | 4 |
| 7 | A | do | Zn octoate | 15 | $T_2$ | 20 |
| 8 | A | do | Pb octoate | 14 | $T_2$ | 5 |
| 9 | B | do | | 8 | $>T_5$ | 3 |
| 10 | B | Phenol | | 1.5 | $T_0$ | 3 |
| 11 | B | Oxime | Ca octoate | 10 | $T_2$ | 7 |
| 12 | B | do | Zn octoate | 12 | $T_2$ | 8 |
| 13 | B | do | Pb octoate | 11 | $T_2$ | 5 |
| 14 | C | do | | 11 | $T_2$ | 3 |
| 15 | C | Phenol | | 1.5 | $T_0$ | 3 |
| 16 | C | Oxime | Ca octoate | 11 | $T_2$ | 9 |
| 17 | C | do | Zn octoate | 12 | $T_2$ | 25–40 |
| 18 | C | Phenol | do | 13 | $T_2$ | 9 |
| 19 | C | Oxime | Pb octoate | 13 | $T_2$ | 25–30 |

The data in Table II shows that the uncatalyzed oxime-blocked isocyanate-containing compositions give a faster and better cure than the comparable uncatalyzed phenol-blocked compositions. When catalyzed with the same level of zinc octoate catalyst, the oxime-blocked isocyanate containing compositions cure to a film having approximately the same hardness, but having substantially better impact resistance than the comparable phenol-blocked compositions. Furthermore, the compositions catalyzed with zinc octoate generally show substantially better impact resistance and approximately the same hardness as compositions catalyzed with the same level of calcium octoate and lead octoate.

Examples 20–27.—Property development as a function of source of active hydrogen

In the following examples, various active hydrogen containing polymer compositions were cast as films having a dry thickness of 1.5 to 2.0 mils on glass plates, for hardness tests, and on steel panels, for print resistance and solvent resistance tests. The cast films were cured by heating at 300° F. for 30 minute. The films were unpigmented, had a ratio of blocked isocyanate to active hydrogen equivalents of 1.0, and were diluted with xylene to 40% total solids before casting.

The reactants used in formulating the compositions used in Examples 20 to 27 are listed in Table III (all parts are parts by weight).

TABLE III

| Resin | Composition | Percent solids | Solvent |
|---|---|---|---|
| D | Styrene/butyl acrylate/2-hydroxyethyl methacrylate, 35/35/30. | 58.8 | n-Butyl acrylate. |
| E | Styrene/ethyl acrylate/methacrylic acid, 30/60/10. | 50.0 | 3:1 oylene/Cellosolve acetate. |
| F | Styrene/methyl methacrylate/butyl acrylate/2-hydroxyethyl methacrylate/methacrylic acid, 25/10/50/10/5. | 47.7 | Xylene. |
| G | Urethane prepolymer (prepared as in Example 3) | 50 | Do. |
| H | Urethane prepolymer G blocked with 2-butanone oxime. | 50 | Do. |

In the solvent resistance test, each of the coated panels was exposed to toluene for approximately 5 seconds, and the effect of the solvent on the film noted after removing the solvent. Catalyst, where present, was added as zinc octoate, at a level of 0.6% metal on total solids. The properties—Tukon hardness, solvent resistance, and print resistance—of each of the films are summarized in Table IV.

TABLE IV.—PROPERTY DEVELOPMENT AS A FUNCTION OF SOURCE OF ACTIVE HYDROGEN

| Example number | Resin | Isocyanate | Catalyst | Tukon hardness (KHN) | Solvent resistance | Print resistance |
|---|---|---|---|---|---|---|
| 20 | D | H | Zn octoate | 14.8 | Softens | Light to medium. |
| 21 | E | H | do | 10.9 | Dissolves | Very heavy. |
| 22 | F | H | do | 11.8 | Softer | Medium. |
| 23 | E | G | | 15.1 | Dissolves | Very heavy. |
| 24 | E | G | Zn octoate | 15.2 | do | Medium to heavy. |
| 25 | D | None | | Soft | | |
| 26 | E | do | | Soft | | |
| 27 | F | do | | Soft | | |

The above data indicates that active-hydrogen atoms from hydroxyl groups give better cure than those from acid. The data also shows the useful properties obtained when an oxime-blocked urethane prepolymer is used as the curing agent, and the improved solvent resistance obtained when the blocked isocyanate prepolymer is used in place of a comparable unblocked isocyanate prepolymer.

Examples 28–31

In the following examples, the effectiveness of zinc octoate as a catalyst was compared to that of the known unblocking catalyst dibutyltin dilaurate. A polymer having the composition 16% methyl methacrylate, 16% styrene, 38% butyl acrylate, 28% hydroxyethyl methacrylate, and 2% methacrylic acid (all percent by weight) was coated at a thickness of about 1 mil onto steel panels and cured at 300° F. for 30 minutes with an equivalent amount of Resin H using each of the catalysts named above. The catalysts were used at two levels—0.12% and 0.36% by weight of metal based on solid resin content. The properties of the coated panels are summarized in Table V.

TABLE V

| Example number | Metal content | Tukon hardness (KHN) | Reverse impact (inch pounds) | Direct impact (inch pounds) |
|---|---|---|---|---|
| 28 | 0.12% Sn | 13.5 | 5–10 | 70–80 |
| 29 | 0.12% Zn | 12.6 | 40–50 | 90–100 |
| 30 | 0.36% Sn | 12.3 | 10–20 | 40–50 |
| 31 | 0.36% Zn | 11.4 | ~80 | ~100 |

The above data indicates that the zinc catalyzed coatings give much greater reverse impact and slightly improved direct impact than the tin-catalyzed coatings.

It is to be understood that changes and variations may be made without departing from the spirit and scope of the invention as defined by the appended claims.

I claim:
1. A thermosetting coating composition comprising a ketoxime-blocked polyisocyanate and a solution copolymer of (a) about 5 to about 15% by weight of an active hydrogen containing monoethylenically unsaturated compound, (b) about 1 to about 5% by weight of a monoethylenically unsaturated carboxylic acid, and (c) about 80 to about 94% by weight of at least one other copolymerizable ethylenically unsaturated compound.

2. A coating composition according to claim 1 wherein the active hydrogen containing compound has the formula

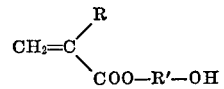

wherein R is hydrogen or a methyl group, and R' is a divalent $(C_2-C_5)$ alkylene radical.

3. A coating composition according to claim 2 wherein the carboxylic acid is acrylic acid or methacrylic acid.

4. A coating composition according to claim 2 wherein the other copolymerizable unsaturated compound is selected from the group consisting of styrene, $(C_1-C_4)$ alkyl esters of acrylic and methacrylic acid, and mixtures thereof.

5. A coating composition according to claim 1 wherein the ketoxime-blocked polyisocyanate is a 2-butanone oxime-blocked isocyanate.

6. A coating composition according to claim 5 wherein the ketoxime-blocked polyisocyanate is 2-butanone oxime-blocked 2-isocyanatoethyl 6-isocyanatocaproate.

7. A coating composition according to claim 1 which also comprises an organosoluble zinc salt.

8. A coating composition according to claim 7 wherein the zinc salt is zinc octoate.

9. A method of providing a coating for a substrate comprising applying to the substrate a layer of a composition according to claim 1 and subsequently heating at a temperature of about 80° to 325° C. to cure the composition.

10. A method of providing a coating for a substrate comprising applying to the substrate a layer of a composition according to claim 8 and subsequently heating at a temperature of about 80° to 325° C. to cure the composition.

11. An article having a cured coating of the composition of claim 1.

References Cited

UNITED STATES PATENTS

| | | | |
|---|---|---|---|
| 3,245,941 | 4/1966 | Mayer et al. | 260—77.5 X |
| 3,252,848 | 5/1966 | Borsellino | 260—77.5 X |
| 3,532,652 | 10/1970 | Zang et al. | 260—23 |
| 3,401,135 | 9/1968 | Sato | 260—80.75 |
| 3,583,943 | 6/1971 | Weber et al. | 260—77.5 |

OTHER REFERENCES

Saunders et al.: "Polyurethanes: Chemistry and Technology I. Chemistry," pp. 167, 168, 169 (1963).

DONALD E. CZAJA, Primary Examiner

D. J. BARRACK, Assistant Examiner

U.S. Cl. X.R.

117—161 KP; 260—23 AR, 77.5 TB, 77.5 AB, 77.5 CR